Patented Sept. 14, 1948

2,449,241

UNITED STATES PATENT OFFICE 2,449,241

IMIDAZOLINES

Karl Miescher and Willi Klarer, Riehen, Switzerland, assignors to Ciba Pharmaceutical Products Inc., Summit, N. J.

No Drawing. Application March 10, 1945, Serial No. 582,189. In Switzerland March 23, 1944

4 Claims. (Cl. 260—309.6)

The manufacture of aminoalkyl-imidazolines is known (cf. for example, U. S. Patents Nos. 2,252,721 and 2,252,722). The compounds described therein have a strong action on the blood pressure and the vessels.

It has now surprisingly been found that 2-(N-aryl-N-aralkyl - aminoalkyl) - imidazolines, such as for example the 2-(N-phenyl-N-benzyl-aminomethyl)-imidazoline, have an antiallergic action. They prove to be well tolerated, particularly by peroral application. These compounds have hitherto not been described. According to the present process the new imidazolines can be prepared by causing a reactive ester of a 2-hydroxyalkyl-imidazoline to react with an N-aryl-N-aralkylamine.

As reactive esters of 2-hydroxyalkyl-imidazolines there are particularly used esters with strong inorganic and organic acids such as e. g. hydrohalogen acids as well as alkyl and arylsulfonic acids. The reaction can be carried out in the presence or absence of diluents and/or condensing agents.

The new compounds find application in pharmaceutics or as intermediate products for the preparation of therapeutic substances.

The following example illustrates the invention, but is not to be regarded as limiting it in any way, the parts being by weight:

Example 15.4 parts of 2-chloromethylimidazoline-hydrochloride, 45.8 parts of N-benzylaniline and 150 parts of alcohol are heated in an oil bath at 100–110° C. After distilling off the alcohol, the reaction mass is maintained at this temperature for a further 3 hours and then triturated with water and 10 parts of sodium bicarbonate. The unconsumed benylaniline is extracted with ether and the aqueous solution neutralized with dilute hydrochloric acid. By evaporating this solution and extracting the residue with alcohol there is obtained 2-(N-phenyl-N-benzylaminomethyl)-imidazoline-hydrochloride in the form of colorless crystals of melting point 227–229° C.

Instead of starting from chloromethyl-imidazoline-hydrochloride it is also possible to use another reactive ester of 2-hydroxymethyl-imidazoline, such as for example hydrobromic acid- or toluenesulfonic acid-ester. Instead of the hydrochloride there can also be used another salt.

In analogous manner there are obtained the following 2-(N-aryl-N-aralkyl-aminoalkyl)-imidazolines:

2-[N-(2'-methoxyphenyl) - N - benzyl - aminoethyl]-imidazoline hydrochloride of melting point 168–169° C;

2-[N-(4'-methoxyphenyl) - N - benzyl - aminomethyl]-imidazoline hydrochloride of melting point 206–208° C;

2-[N-(2' - ethoxyphenyl) - N - benzyl - aminomethyl]-imidazoline hydrochloride of melting point 187–188° C;

2-[N-(4' - ethoxyphenyl) - N - benzyl - aminomethyl]-imidazoline hydrochloride of melting point 216–218° C;

2-[N-naphthyl-(1') - N - benzyl - aminomethyl]-imidazoline hydrochloride of melting point 207–209° C;

2-[N-phenyl-N-benzyl-aminopropyl]-imidazoline hydrochloride of melting point 193–195° C. and 2-[N-phenyl-N-phenylethyl-aminomethyl] - imidazoline hydrochloride of melting point 220–222° C.

What we claim is:

1. The 2-(N-aryl-N-aralkyl-aminoalkyl)-imidazolines, the aminoalkyl group being a lower aminoalkyl group.
2. The 2-(N-phenyl-N-benzyl-aminomethyl)-imidazoline.
3. The 2-[N-(4'-methoxyphenyl) - N - benzyl-aminomethyl]-imidazoline.
4. The 2-[N-naphthyl-(1')-N-benzyl - aminomethyl]-imidazoline.

KARL MIESCHER.
WILLI KLARER.

REFERENCES CITED

The following references are of record in the file of this patent:

UNITED STATES PATENTS

| Number | Name | Date |
|---|---|---|
| 2,252,721 | Miescher et al. | Aug. 19, 1941 |

OTHER REFERENCES

Chemical Abstracts, vol. 37 (1943), page 3505.

Certificate of Correction

Patent No. 2,449,241. September 14, 1948.

KARL MIESCHER ET AL.

It is hereby certified that error appears in the printed specification of the above numbered patent requiring correction as follows: Column 1, line 39, for "benylaniline" read *benzylaniline*; and that the said Letters Patent should be read with this correction therein that the same may conform to the record of the case in the Patent Office.

Signed and sealed this 16th day of November, A. D. 1948.

[SEAL]

THOMAS F. MURPHY,
*Assistant Commissioner of Patents.*